United States Patent
Sims, III et al.

(10) Patent No.: US 9,761,932 B1
(45) Date of Patent: Sep. 12, 2017

(54) CONCEALED ANTENNA APPARATUS FOR A MOTORCYCLE AND RELATED METHODS

(71) Applicant: Radio Sound, Inc., Louisville, KY (US)

(72) Inventors: Ernest Theodore Sims, III, Louisville, KY (US); Richard Anthony Feller, Louisville, KY (US)

(73) Assignee: Radio Sound, Inc., Louisville, KY (US)

( * ) Notice: Subject to any disclaimer, the term of this patent is extended or adjusted under 35 U.S.C. 154(b) by 76 days.

(21) Appl. No.: 14/466,291

(22) Filed: Aug. 22, 2014

Related U.S. Application Data

(60) Provisional application No. 61/979,134, filed on Apr. 14, 2014.

(51) Int. Cl.
*H01Q 1/32* (2006.01)
*B62J 6/04* (2006.01)
*B62J 6/00* (2006.01)

(52) U.S. Cl.
CPC .............. *H01Q 1/325* (2013.01); *B62J 6/001* (2013.01); *B62J 6/04* (2013.01)

(58) Field of Classification Search
CPC ........... B62J 6/001; B62J 6/04; B60Q 1/2657; B60Q 1/44; B60Q 1/444; H01Q 1/32; H01Q 1/325
See application file for complete search history.

(56) References Cited

U.S. PATENT DOCUMENTS

| | | | |
|---|---|---|---|
| 2,252,395 A | 8/1941 | Cohen | |
| 3,210,726 A * | 10/1965 | Copsy | B60Q 9/008 180/271 |
| 5,448,456 A * | 9/1995 | Huynh | B60Q 1/2657 340/479 |
| 6,714,129 B1 | 3/2004 | Luna, Sr. | |
| 6,943,740 B1 * | 9/2005 | Garabedian | H01Q 1/3283 343/711 |
| 7,324,840 B2 | 1/2008 | Miyazaki et al. | |
| 7,741,782 B2 | 6/2010 | Vermeulen et al. | |
| 2002/0003501 A1 * | 1/2002 | Kushida | H01Q 1/3291 343/721 |
| 2007/0285912 A1 | 12/2007 | Lin | |
| 2014/0268839 A1 * | 9/2014 | Timmerberg | B62J 6/005 362/473 |

* cited by examiner

*Primary Examiner* — Thai Pham
(74) *Attorney, Agent, or Firm* — King & Schickli, PLLC

(57) ABSTRACT

An antenna apparatus is for use in connection with a light and a switch for selectively supplying power to the light through associated wiring. The apparatus comprises a circuit connected between the light and the switch, the circuit including a filter, a decoupling circuit, and an antenna formed at least in part by the wiring associated with the light. The apparatus may be used in connection with a light on a vehicle, such as a brake light for a motorcycle, and may thus be concealed from view. Related methods are also disclosed.

17 Claims, 3 Drawing Sheets

CONCEALED ANTENNA APPARATUS FOR A MOTORCYCLE AND RELATED METHODS

This patent application claims the benefit of U.S. Provisional Patent Application Ser. No. 61/979,134, the disclosure of which is incorporated herein by reference.

TECHNICAL FIELD

This disclosure relates to the antenna arts and, more particularly, to a concealed antenna apparatus that may be especially adapted for use in connection with a vehicle light.

BACKGROUND

Vehicles such as cars or motorcycles typically have a separate freestanding antenna that is used to transmit or receive signals. In some instances, providing such an antenna is inconvenient, such as for example in the case of a motorcycle where the space for locating such an antenna may be limited. In the past, it is known to provide the antenna in the vehicle windshield. However, this requires a specialized antenna and can be costly to implement, especially since it is desirable to make the antenna invisible in use.

Accordingly, a need is identified for a solution to these and other problems associated with prior art antennas.

SUMMARY

In one aspect, an apparatus for forming an antenna for receiving electromagnetic waves using a light on a vehicle (such as a motorcycle) associated with a switch for selectively supplying power through associated wiring to the light upon actuation of the switch is disclosed. The apparatus comprises a circuit connected between the switch and light, the circuit comprising components for isolating the associated wiring from the light.

In one embodiment, the circuit comprises one or more high impedance circuit elements, and may further include a common mode choke. One or more inductors may also be provided as part of the circuit, which may take the form of one or more ferrite beads. The circuit may also include a filter for preventing noise from the switch from interfering with the operation of the antenna. A cable may also be provided for connecting a receiver to the portion of the circuit serving as the antenna.

Another aspect of the disclosure pertains to an apparatus for providing an antenna for a radio associated with a vehicle. The apparatus comprises a light assembly adapted for connection to the vehicle. The light assembly includes at least one light and wiring for supplying power from a power source to the light. The light is positioned within a housing including an at least translucent cover for allowing light to pass external to the housing. A circuit is provided for isolating the wiring for supplying power for the light from the power source, such that at least a portion of the isolated wiring forms an antenna element of the antenna.

In one embodiment, the antenna is not visible on the vehicle, which may comprise a motorcycle. The light may comprise a brake light for the motorcycle associated with a switch for controlling the supply of power to the brake light. A cable may be provided to connect the radio to the isolated wiring downstream of the circuit, and a filter may be provided for preventing noise from the switch from interfering with the antenna.

A further aspect of the disclosure pertains to an apparatus for providing a concealed antenna for a radio. The apparatus comprises a vehicle and a light assembly connected to the vehicle. The light assembly comprises at least one light, a housing including an at least translucent cover for allowing light to pass from the light to external to the housing, and the concealed antenna for receiving radio signals. The concealed antenna is not provided as an upstanding element on the vehicle.

The light assembly comprises wiring for supplying power for the light and the wiring is used as an antenna element of the concealed antenna. The vehicle may comprise a motorcycle, and the concealed antenna thus avoids the presence of the upstanding external antenna on the motorcycle, where there may be limited space for it.

Also forming part of the disclosure is a method of providing an antenna for a radio associated with a vehicle including a switch for selectively providing power through wiring to a light. The method comprises isolating a first portion of the wiring used to supply power from the switch to the light, and receiving radio signals using a second portion of the wiring, such that the second portion of the wiring receives radio signals. The isolating may comprise providing a decoupling circuit between the switch for controlling the light and the light. The method may further include the step of providing a filter for filtering noise from the switch.

BRIEF DESCRIPTION OF THE DRAWING FIGURES

DETAILED DESCRIPTION

Figure 1:
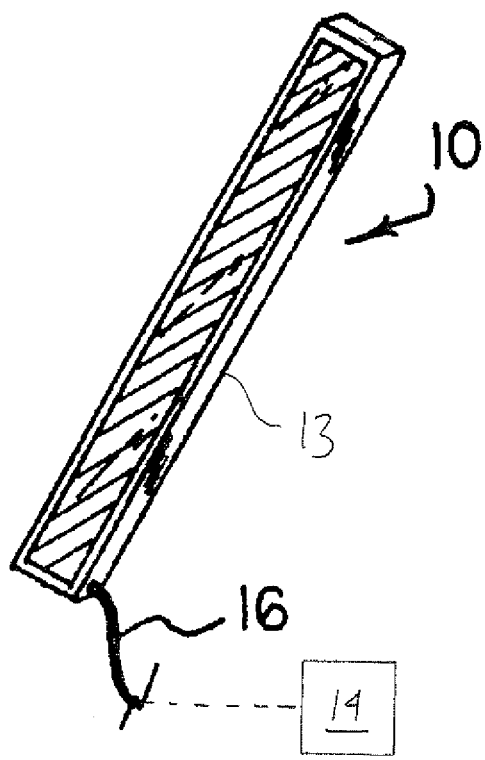
FIG. 1 is a perspective view of a light assembly including the antenna apparatus.
Figure 2:
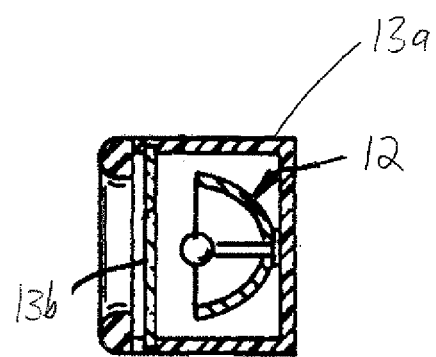
FIG. 2 is a cross-sectional view if the light assembly of FIG. 1.

Referring now to FIGS. 1 and 2, a description is provided of one possible embodiment of an antenna apparatus 10 according to the disclosure. In the illustrated example, the antenna apparatus 10 comprises a circuit for use in connection with a vehicle (such as a straddle vehicle in the form of a motorcycle 100; see FIG. 4) and, in particular, an existing light 12 for providing illumination in connection with the operation of the vehicle (such as for example, a tail light assembly for indicating the application of braking by an operator of the vehicle).

The light 12 may be contained within a housing 13 and may be a filament lamp or an LED. The housing 13 may include a backing portion 13a and a transparent or translucent cover 13b for allowing light energy to emanate from the apparatus 10, such as in connection with the braking of the associated vehicle). The light 12 is illustrated as having a generally rectangular configuration, but may be square, round, oval, triangular, or any other shape, without limitation. The light 12 also need not be included within any housing in order to achieve the benefits described herein.

The light 12 may be actuated, or have power supplied thereto from a power supply 15, via a switch 14 connected to the light by associated wiring 16. The switch 14 may be, for example, one associated with a foot or hand brake in the case of a braking light as is known in the art. However, the apparatus may also be used in connection with any other light on the vehicle as well.

Figure 3:
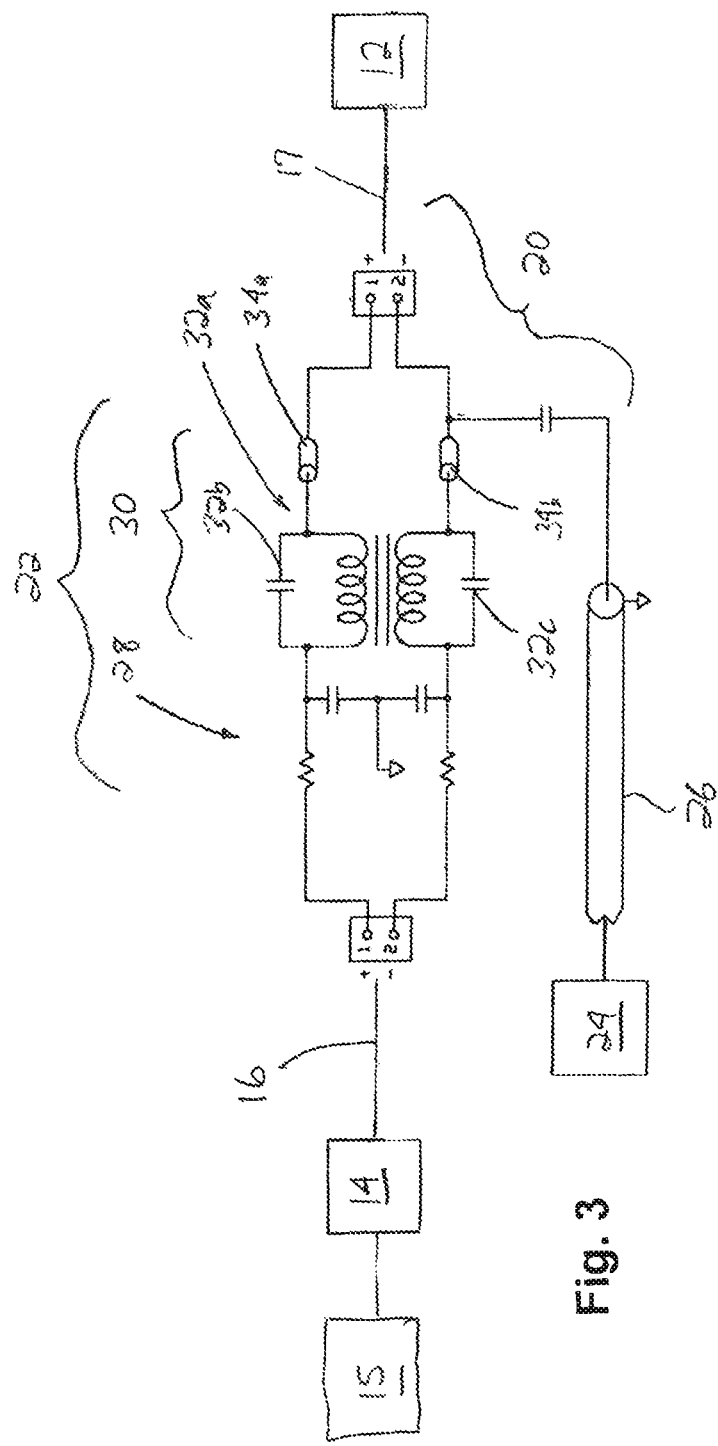
FIG. 3 is a schematic view illustrating the antenna apparatus.

At least a portion of the wire within the antenna apparatus 10 for supplying the light 12 with power serves as an antenna element 17 of the antenna apparatus 10 for receiving or, in another possible embodiment, transmitting electromagnetic or radio waves. In particular, and with reference to FIG. 3, the apparatus 10 may include an antenna 20 formed in part by the wiring/antenna element 17, which may be connected to a decoupling circuit 22, which as discussed below in more detail may include an input filter 28 (e.g., an active filter, an LC filter, or a multistage filter, among others), and a high impedance circuit 30. The decoupling circuit 22 functions to isolate the antenna 20 from the brake light switch 14 and associated wiring 16, and to prevent noise from combining with a received signal.

The antenna 20 provides the received signal to a device 24, such as a radio or the like, a CB device, or other types of communication devices which rely on the transmission and receipt of electromagnetic waves (e.g., motorcycle to motorcycle communication devices). The antenna 20 may be connected to the device 24 at a remote location on the vehicle by way of a coaxial cable 26. It should be noted that other suitable cable types may likewise be utilized.

In this particular embodiment, the decoupling circuit 22 comprises an input filter 28 to prevent electrical noise associated with the upstream brake light switch 14 from interfering with the electromagnetic waves received by the antenna element 17 within the antenna 20. The high impedance circuit 30 serves to electrically isolate the antenna 20 from the filter 28, the brake light switch 14, and the associated wiring 16 within the vehicle. As can be appreciated, the entire assembly forming the apparatus 10 may be provided as a single cable with appropriate leads for connecting the brake light to the switch 14 and device 24 (e.g., radio), respectively.

In the illustrated example, the high impedance circuit 30 comprises a common mode choke 32*a* providing a high impedance for isolating the wiring serving as the antenna element 17 within the AM broadcast band. The common mode choke 32*a* may be associated with optional capacitors 32*b*, 32*c*. These capacitors 32*b*, 32*c* may be omitted if the antenna 20 functions properly in the AM band regardless.

In this example, the high impedance circuit 30 further comprises one or more inductors with high impedance for electrically isolating the antenna 20 within the FM broadcast band. These high impedance inductors are ferrite beads 34*a*, 34*b* in the present example. However, the high impedance circuit 30 could also take different forms besides the common mode choke 32*a* and the ferrite beads 34*a*, 34*b*, such as one or more inductors with higher impedance in the desired radio bands.

Figure 4:
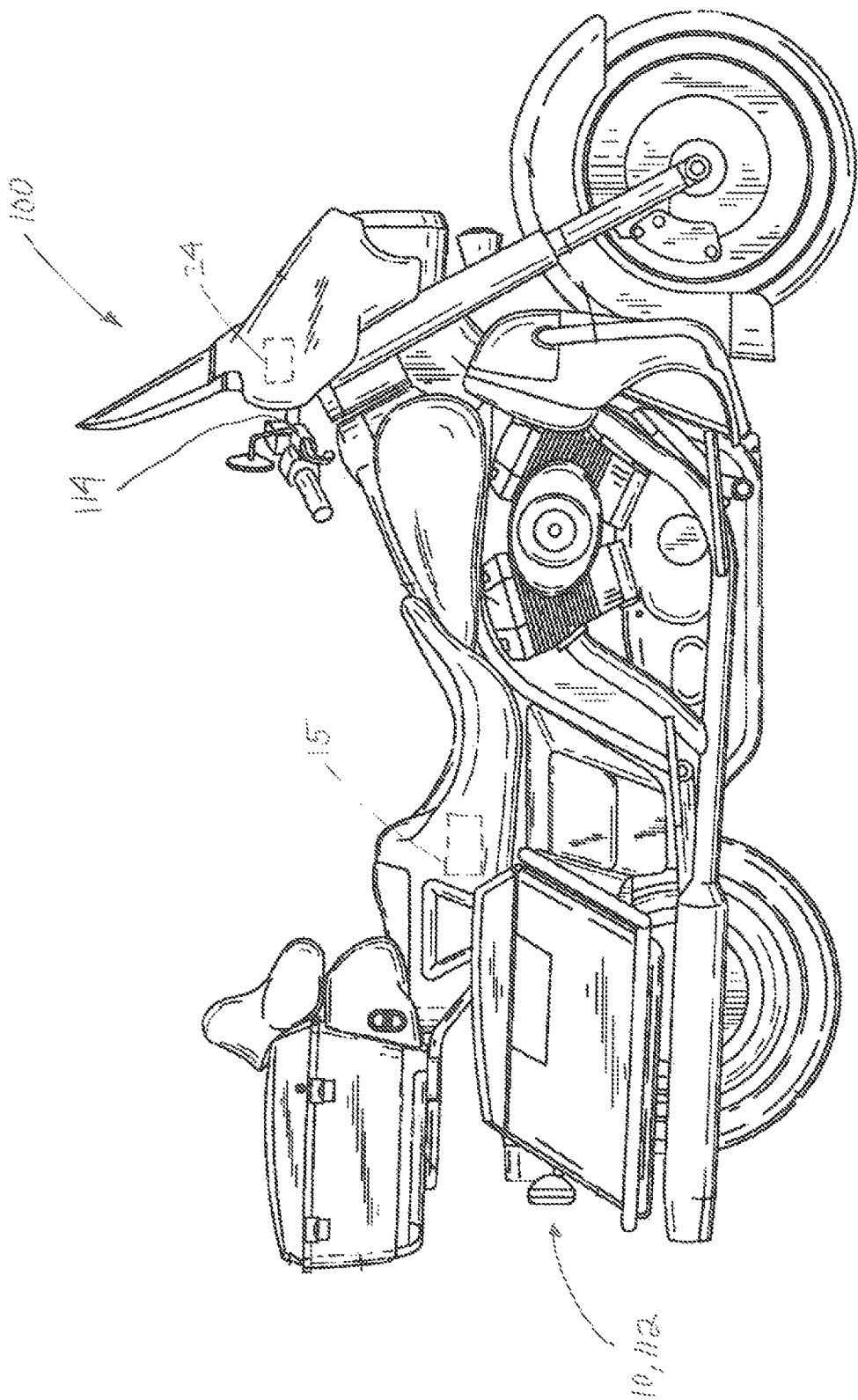
FIG. 4 is an illustration of a motorcycle including the antenna apparatus.

Reference is made to FIG. 4, which illustrates a vehicle in the form of a motorcycle 100 including the antenna apparatus 10 as part of a brake light assembly 112. Selective control of the light assembly 112 may be achieved using a hand lever 114. As can be appreciated, the concealment of the antenna apparatus 10 in this manner means that it cannot be seen on the motorcycle 100 serving as the exemplary vehicle for purposes of illustration, which is contrasted with prior approaches where the antenna is an upstanding element associated with the vehicle.

In summary, an antenna apparatus 10 is provided for use in combination with a circuit for a light, such as in a vehicle. The apparatus 10 filters electrical noise to avoid interference with electromagnetic signals received by an antenna 20, which utilizes wire within the light circuit as an antenna element 17, and electrically isolates the brake light switch 14 and associated wiring 16 that would otherwise become part of the antenna element 17 from the antenna 20. Use of the apparatus may avoid the need for a conventional upstanding antenna on vehicles where space is limited, such as a motorcycle, or where otherwise inconvenient, such as a convertible.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. An apparatus for providing an antenna for a radio associated with a vehicle, comprising:
    a light assembly adapted for connection to the vehicle, the light assembly comprising at least one light and wiring for supplying power from a power source for the at least one light, the at least one light positioned within a housing including an at least translucent cover for allowing light to pass external to the housing; and
    a circuit for isolating the wiring for supplying power for the at least one light from the power source, wherein at least a portion of the isolated wiring forms an antenna element of the antenna connected to the radio.

2. The apparatus of claim 1, wherein the antenna is not visible on the vehicle.

3. The apparatus of claim 1, wherein the vehicle comprises a motorcycle, and the light assembly comprises a brake light for the motorcycle associated with a switch for controlling the supply of power to the brake light.

4. The apparatus of claim 3, wherein a cable connects the radio to the isolated wiring.

5. The apparatus of claim 4, further including a filter between the switch and the light for filtering noise.

6. The apparatus of claim 1, wherein the circuit comprises a common mode choke.

7. The apparatus of claim 1, wherein the circuit comprises at least two inductors.

8. The apparatus of claim 7, wherein the at least two inductors are ferrite beads.

9. A method of providing an antenna for a radio associated with a vehicle including a switch for selectively providing power through wiring to a light and a circuit for isolating the wiring for supplying power for at least one light from the power source, the method comprising:
    providing an isolated portion of the wiring for receiving radio signals,
    whereby the isolated portion may serve as the antenna connected to the radio.

10. The method of claim 9, wherein the method further comprises providing a decoupling circuit between the switch and the light.

11. The method of claim 10, wherein the decoupling circuit comprises a filter for filtering noise from the switch.

12. An apparatus for providing an antenna, comprising:
    a vehicle including a radio associated with a power source, the vehicle including a brake light; and
    a circuit including wiring supplying power from the power source to the brake light when a switch is closed, wherein a portion of the wiring is isolated from the power and the switch and at least a portion of the isolated wiring forms an antenna element of the antenna connected to the radio.

13. The apparatus of claim 12, wherein the circuit comprises a decoupling circuit between the switch and the brake light.

14. The apparatus of claim 12, wherein the circuit comprises a common mode choke.

15. The apparatus of claim 12, wherein the circuit comprises at least two inductors.

16. The apparatus of claim 15, wherein the at least two inductors are ferrite beads.

17. The apparatus of claim 12, further including a cable connecting the radio to portion isolated from the power source.

* * * * *